US008826812B2

(12) United States Patent  
Kim

(10) Patent No.: US 8,826,812 B2  
(45) Date of Patent: Sep. 9, 2014

(54) JUICE EXTRACTION MODULE FOR JUICER

(71) Applicants: Nuc Electronics, Co., Ltd., Daegu (KR); Ji Tae Kim, Daegu (KR)

(72) Inventor: Jong Boo Kim, Daegu (KR)

(73) Assignees: NUC Electronics Co., Ltd., Daegu (KR); Ji Tae Kim, Daegu (KR)

( * ) Notice: Subject to any disclaimer, the term of this patent is extended or adjusted under 35 U.S.C. 154(b) by 0 days.

(21) Appl. No.: 13/964,822

(22) Filed: Aug. 12, 2013

(65) Prior Publication Data

US 2014/0196614 A1  Jul. 17, 2014

(30) Foreign Application Priority Data

Jan. 14, 2013  (KR) ........................ 10-2013-0004115

(51) Int. Cl.

| A23B 5/00 | (2006.01) |
| A23N 1/00 | (2006.01) |
| A47J 43/14 | (2006.01) |
| A23J 1/00 | (2006.01) |
| B02C 15/00 | (2006.01) |
| B04B 5/10 | (2006.01) |
| A23N 1/02 | (2006.01) |

(52) U.S. Cl.
CPC .......................................... *A23N 1/02* (2013.01)
USPC .................... 99/513; 99/495; 99/501; 99/502

(58) Field of Classification Search
USPC .................. 99/495, 501, 503, 504, 506, 507, 99/508–513; 100/213, 345, 349–352; 241/37.5
See application file for complete search history.

(56) References Cited

U.S. PATENT DOCUMENTS

| 1,906,054 A | 4/1933 | Freese |
| 2,304,929 A | 12/1942 | Keith |
| 4,440,074 A | 4/1984 | Ihara et al. |
| 5,669,289 A | 9/1997 | Chen |
| 5,906,154 A | 5/1999 | Yoon et al. |
| 5,970,860 A | 10/1999 | Yip |
| 6,604,455 B2 | 8/2003 | Areh et al. |

(Continued)

FOREIGN PATENT DOCUMENTS

| CN | 201767733 U | 3/2011 |
| CN | 103202653 A | 7/2013 |

(Continued)

*Primary Examiner* — Dana Ross  
*Assistant Examiner* — Lindsey C. Teaters  
(74) *Attorney, Agent, or Firm* — Seed IP Law Group PLLC

(57) ABSTRACT

A juice extraction module for a juicer is provided, which includes a container formed with a juice discharge port; a sieve positioned inside of the container; a screw positioned inside of the sieve to extract juice from a material; a lid coupled to a top end of the container and formed with an input portion through which the material is input; and a safety cover rotatably installed to a main input opening of a top end of the input portion to be movable between a first position and a second position. The safety cover includes a first cover portion erected to open the main input opening in the first position and closing the main input opening in the second position; and a second cover portion formed integrally with the first cover portion, the second cover portion moving the safety cover to the second position when the second cover portion is pushed by a downward applied force from the first position, whereby the first cover portion blocks the main input opening.

19 Claims, 9 Drawing Sheets

(56) References Cited

U.S. PATENT DOCUMENTS

| | | | |
|---|---|---|---|
| 6,637,323 B2 | 10/2003 | Kim | |
| 7,461,801 B2 * | 12/2008 | Chang | 241/37.5 |
| 8,091,473 B2 | 1/2012 | Kim | |
| 2004/0231529 A1 | 11/2004 | Jan | |
| 2008/0196599 A1 * | 8/2008 | Bhagat | 99/444 |
| 2009/0049998 A1 | 2/2009 | Kim | |

FOREIGN PATENT DOCUMENTS

| | | |
|---|---|---|
| EP | 2497393 A1 | 9/2012 |
| FR | 2967034 A1 | 5/2012 |
| JP | 06-319505 | 11/1994 |
| KR | 20-1993-0012778 U | 7/1993 |
| KR | 10-1995-0000072 B1 | 1/1995 |
| KR | 20-1995-0013027 | 6/1995 |
| KR | 20-1996-0000061 Y1 | 1/1996 |
| KR | 20-1996-0003085 Y1 | 4/1996 |
| KR | 10-1996-0016782 A | 6/1996 |
| KR | 20-1999-0016788 | 5/1999 |
| KR | 10-2000-0074261 A | 12/2000 |
| KR | 10-2001-0012045 A | 2/2001 |
| KR | 10-0285120 B1 | 3/2001 |
| KR | 10-2002-0059458 B1 | 7/2002 |
| KR | 20-0322266 | 7/2003 |
| KR | 20-0376615 | 2/2005 |
| KR | 20-0392588 Y1 | 8/2005 |
| KR | 10-2005-0101127 A | 10/2005 |
| KR | 10-2006-0025924 A | 3/2006 |
| KR | 10-0793852 B1 | 9/2006 |
| KR | 10-0755440 B1 | 9/2007 |
| KR | 10-0966607 B1 | 6/2010 |
| KR | 10-2012-0029640 A | 3/2012 |
| KR | 10-2012-0042606 A | 5/2012 |
| KR | 1020120054572 A | 5/2012 |
| WO | 2010/007290 A2 | 1/2010 |
| WO | 2012/108588 A1 | 8/2012 |
| WO | 2013/053228 A1 | 4/2013 |

* cited by examiner

JUICE EXTRACTION MODULE FOR JUICER

BACKGROUND

1. Technical Field

The present disclosure relates to a juice extraction module for a juicer, and more specifically, to a juice extraction module for a juicer having an improved structure capable of eliminating the inconvenience that a material should be chopped before the material is input into the juicer.

2. Description of the Related Art

In general, a juicer includes a main body, and a juice extraction module mounted onto the main body.

The juice extraction module includes a container having a juice extraction space, a lid having an input portion through which a material is input into the container, a screw for extracting juice from the material in the container, and a sieve for separating juice and residues from each other.

The main body includes a driving motor for rotating the screw, and a shaft of the driving motor is connected to the screw in the juice extraction module.

In the conventional juicer, the material should be chopped into such a size that the screw can extract juice.

As an example, Korean Patent No. 10-0793852 discloses a juicer configured to cut or sever a material by a screw blade protruding from a central axis of a screw toward one side of an uppermost end.

However, in the above technique, when a material has a size larger than the length of the screw blade, the material should be chopped in advance into a size smaller than the length of the screw blade.

In addition, Korean Patent No. 10-0966607 discloses a juicer having a grater provided in an entire upper surface over a screw to crush a material just before juice is extracted.

However, there are problems in that the crush using the greater is achieved at a speed higher than an ordinary low speed of the juicer and also a user should press the material against the grater by a large force in order to prevent the rotation of the material due to the high speed of the grater.

Also, since the conventional juicer cuts the material and then mills the cut pieces of the material while they are pressed against a sieve in a juice extraction process, the sieve may be deformed in a moment by the pressed cut pieces.

Such deformation destroys a molding for holding a shape of the sieve or decreases the bond between the molding and the sieve to generate a gap between the molding and the sieve causing a leakage of residues and a decrease in juice extraction efficiency.

BRIEF SUMMARY

Embodiments of the present invention provide a juice extraction module for a juicer, in which a structure of crushing a material in advance is provided in a lid and a screw to make it possible to eliminate an inconvenient procedure of chopping or cutting a material in advance before inputting the material through an input portion.

In addition, in order to input a material through the input portion without chopping or cutting the material in advance, it is required to enlarge the size of the input portion. However, if the input portion is enlarged, there may be a safety hazard since a hand of a person, particularly a child, may enter the input portion and then reach the screw.

Thus, embodiments of the present invention may also provide a juice extraction module for a juicer, which has an enlarged input portion for allowing a large material to be input therethrough and at the same time can prevent a safety hazard incident to the size of the enlarged input portion.

According to an aspect of the present invention, there is provided a juice extraction module for a juicer, which includes a container formed with a juice discharge port; a sieve positioned inside of the container; a screw positioned inside of the sieve to extract juice from a material; a lid coupled to a top end of the container and formed with an input portion through which the material is input; and a safety cover rotatably installed to a main input opening of a top end of the input portion to be movable between a first position and a second position, wherein the safety cover comprises a first cover portion erected to open the main input opening in the first position and closing the main input opening in the second position; and a second cover portion formed integrally with the first cover portion, the second cover portion moving the safety cover to the second position when the second cover portion is pushed by a downward applied force from the first position, whereby the first cover portion blocks the main input opening.

According to one embodiment, the safety cover is connected by a hinge to both sides of the main input opening at both sides of a position in which the first cover portion and the second cover portion cross each other.

According to one embodiment, the juice extraction module further includes a bias means installed to the hinge so that the safety cover is biased to the first position.

According to one embodiment, the bias means includes a torsion spring or weight.

According to one embodiment, the juice extraction module according to claim 1, further comprising a locking unit for locking the safety cover at the second position, wherein the locking unit comprises a knob positioned on an upper surface of the first cover portion and a locking piece positioned on a lower surface of the first cover portion and connected to the knob by an connection portion penetrating the first cover portion, the locking unit having a locking groove formed in the inner surface of the input portion so that the locking piece rotated by the knob is inserted into the locking groove.

According to one embodiment, the input portion further comprises a secondary input opening formed in the top end thereof, the secondary input opening having a size smaller than the main input opening.

According to one embodiment, the safety cover has a third position to which the safety cover is further rotated after passing the second position, and the first cover portion and the second cover portion at least partially cover the main input opening and the secondary input opening in the third position, respectively.

According to one embodiment, the juice extraction module further includes a crushing portion formed on a top end of the screw to be narrowed upward, the crushing portion having a crushing blade formed thereon; and a crushing processing portion connected to the input portion and formed in a bottom of the lid to be concave for accommodating the crushing portion, wherein the crushing blade crushes the material in advance within the crushing processing portion.

According to one embodiment, the crushing blade is formed so that the material input through the input portion is crushed while a lateral side of the material is pushed outwards, and the crushing processing portion is provided with an inner surface to hold the material pushed outwards by the crushing blade, whereby the material is crushed between the crushing blade and the inner surface of the crushing processing portion.

According to one embodiment, the crushing processing portion covers an entire bottom region of the input portion at the height of the crushing processing portion connected to a bottom end of the input portion.

According to one embodiment, a bottom region of the input portion is positioned to be offset within a semicircle region of a circle having a diameter corresponding to a diameter of the crushing processing portion with a central shaft of the screw as a center.

According to one embodiment, the inner surface of the crushing processing portion comprises a crushing processing surface formed to be gradually close to the crushing blade in a direction in which the crushing blade runs from the input portion.

According to one embodiment, the inner surface of the crushing processing portion comprises a material guide surface continuing from the input portion and formed to be inclined toward a central axis of the crushing portion, whereby the material guide surface guides the material so that a lateral side of the material begins to be milled by the crushing blade.

According to one embodiment, a bottom end of the material guide surface conforms to an inner surface of the sieve.

According to one embodiment, the inner surface of the crushing processing portion comprises a crushing processing surface formed to be gradually close to the crushing blade in a direction in which the crushing blade runs from the input portion, and a material guide surface continuing from the input portion and formed to be inclined toward a central axis of the crushing portion to cause a lateral side of the material to begin to be milled by the crushing blade.

According to one embodiment, the crushing portion extends to pass over a top end of the sieve and is accommodated in the crushing processing portion.

According to one embodiment, the crushing processing portion comprises a crushing processing surface, and the crushing processing surface is formed with at least one milling blade.

According to one embodiment, the input portion defines a "⌐" shaped material input path.

According to another aspect of the present invention, there is provided a safety cover rotatably installed to an input opening of a mixer or juicer to move between a first position and a second position. The safety cover includes a first cover portion erected to open the main input opening in the first position and closing the main input opening in the second position; and a second cover portion moving the first cover portion to the second position, in which the first cover portion blocks the main input opening, when the second cover portion is pushed by a downward applied force from the first position.

A conventional juicer has inconvenience and difficulty in that an increase in length of a screw blade increases an entire outer diameter of a screw, and thus, a sieve, a container and a lid should be manufactured large so as to be fitted to the screw. However, according to embodiments of the present invention, a material having a diameter larger than a length of a screw blade can be used, and the material can be crushed into a size suitable for extracting juice without increasing an outer diameter of a screw by a crushing processing portion formed to be concave in a bottom of a lid and a crushing portion accommodated in the crushing processing portion and cooperating with the crushing processing portion.

Thus, embodiments of the present invention eliminate the inconvenience and cumbersomeness that a user should chop a material before the material is input.

In addition, a space between the crushing blade and the crushing processing portion is gradually narrowed and the material is caught and simultaneously dragged into between the crushing blade and the crushing processing portion, so that the material is effectively crushed while being automatically supplied to the screw without inconveniently pushing the material.

Further, the juice extraction module for a juicer according to embodiments of the present invention is configured so that the input portion is enlarged to allow a large material to be input and processed, and simultaneously, when a person introduces his or her hand into the input portion, the safety cover is closed before his or her hand reaches the screw below the input portion. Thus, it is possible to prevent a safety hazard incident to the size of the enlarged input portion.

DETAILED DESCRIPTION

Figure 1:
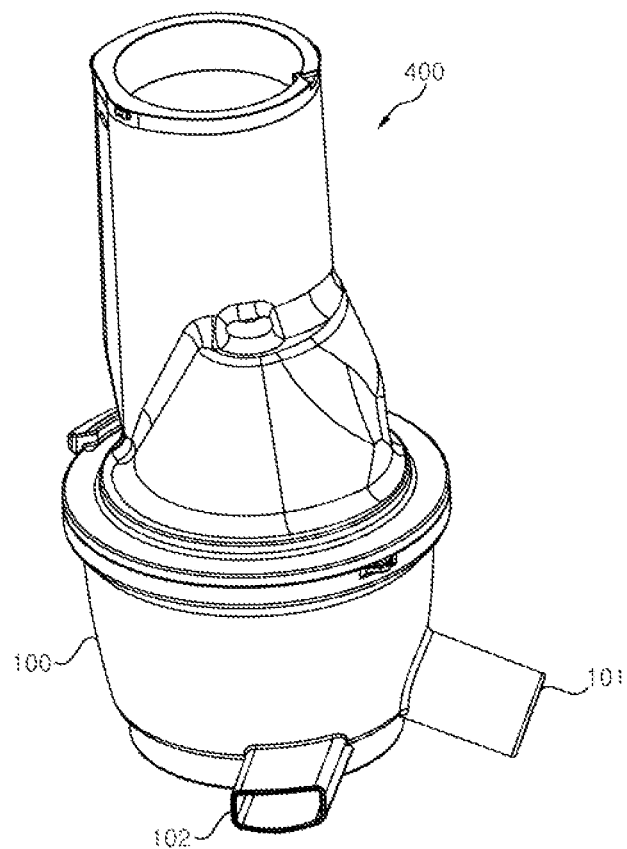
FIG. 1 is a perspective view showing a juice extraction module for a juicer according to one embodiment of the present invention.

Hereinafter, preferred embodiments of the present invention will be described in detail with reference to the accompanying drawings.

The following embodiments are provided only for illustrative purposes.

Therefore, the present invention is not limited to the following embodiments but may be implemented in other forms.

In the drawings, the widths, lengths, thicknesses and the like of elements may be exaggerated for convenience of illustration.

Figure 2:
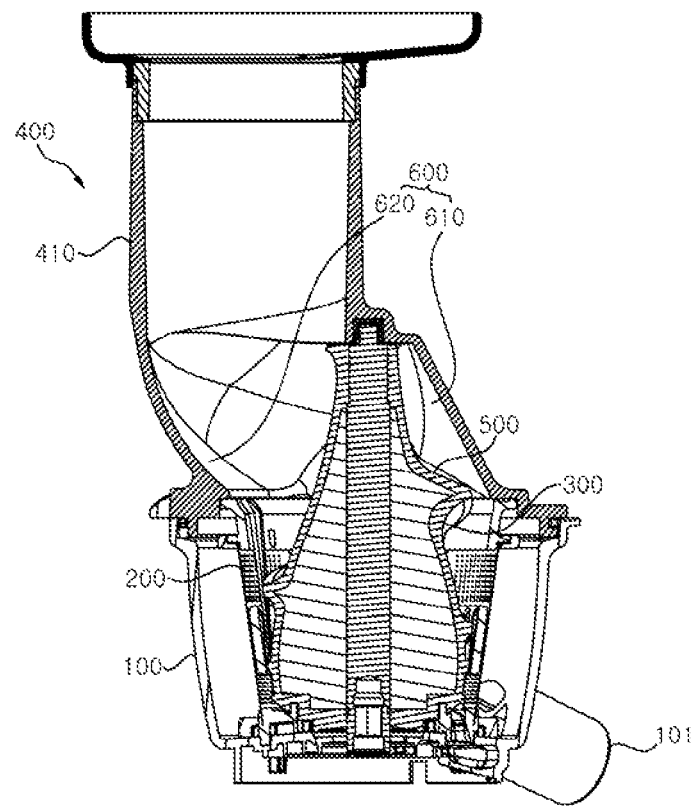
FIG. 2 is a sectional view showing the juice extraction module according to the embodiment of the present invention.
Figure 3:
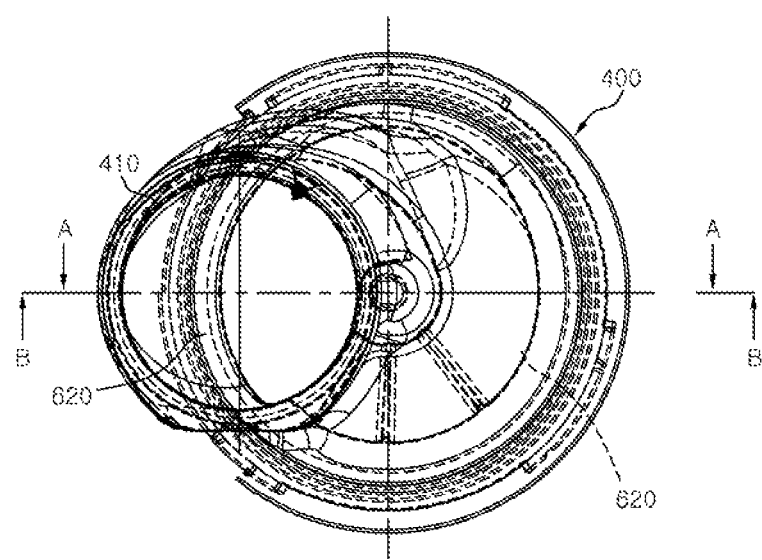
FIG. 3 is a plan view showing a lid of the juice extraction module shown in FIG. 1.
Figure 4:
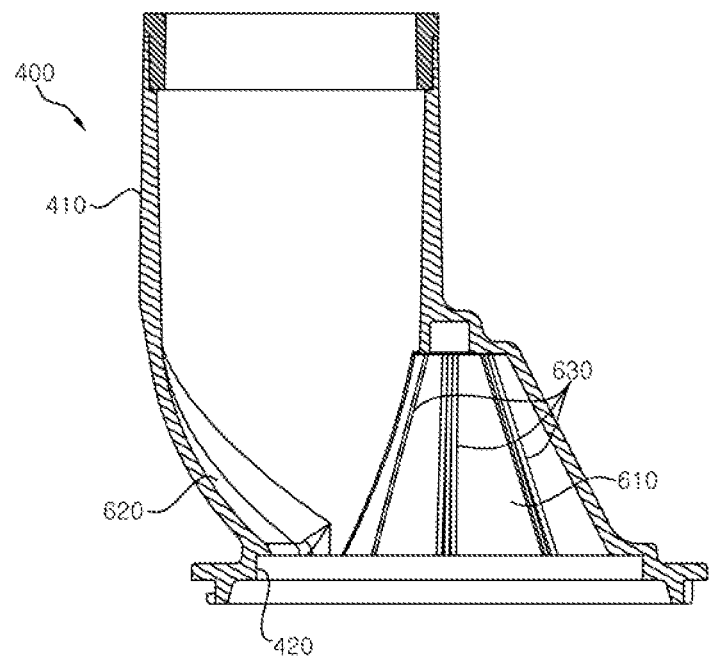
FIG. 4 is a sectional view of the lid taken along line A-A of FIG. 3.
Figure 5:
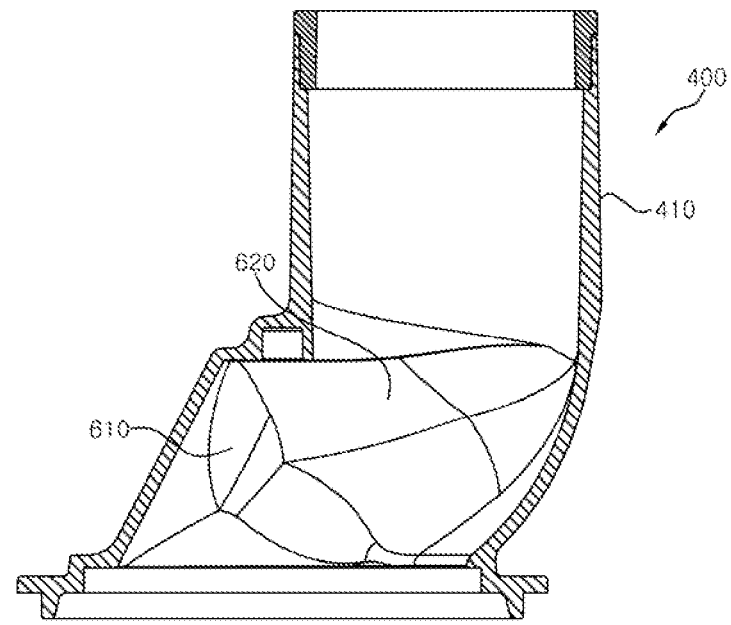
FIG. 5 is a sectional view of the lid taken along line B-B of FIG. 3.
Figure 6:
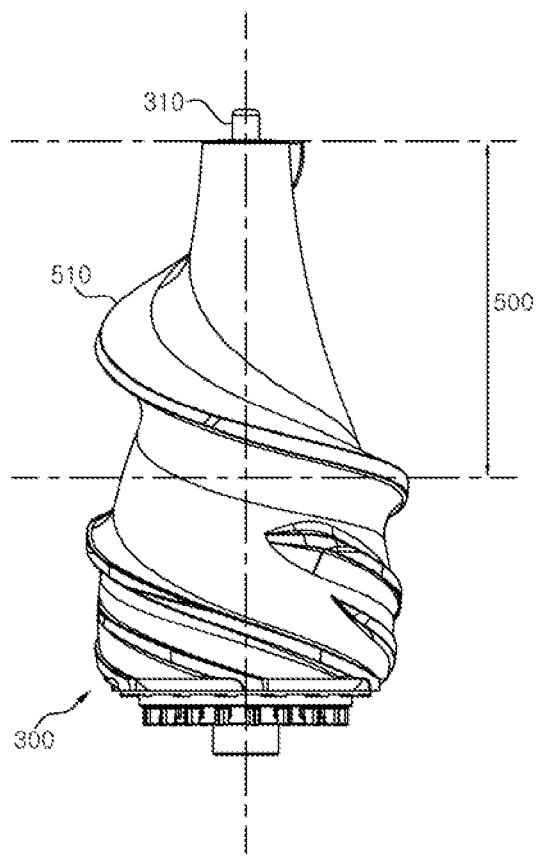
FIG. 6 is a front view showing a screw having a crushing portion provided on a top end thereof as a portion of juice extraction module shown in FIG. 1.

FIG. 1 is a perspective view showing a juice extraction module for a juicer according to one embodiment of the present invention; FIG. 2 is a sectional view showing the juice extraction module according to the embodiment of the present invention; FIG. 3 is a plan view showing a lid of the juice extraction module shown in FIG. 1; FIG. 4 is a sectional view of the lid taken along line A-A of FIG. 3; FIG. 5 is a sectional view of the lid taken along line B-B of FIG. 3; and FIG. 6 is a front view showing a screw having a crushing portion provided on a top end thereof as a portion of juice extraction module shown in FIG. 1.

Referring to FIGS. 1 to 6, a juice extraction module for a juicer according to one embodiment of the present invention includes a container 100 having a juice extraction space defined therein and having a juice discharge port 101 and a residue discharge port 102 respectively formed in one and another sides of an outer surface thereof, a sieve 200 installed inside of the container 100 to separate juice from material residues generated in juice extraction, a screw 300 installed inside of the sieve 200 to extract juice from the material, and a lid 400 installed to a top end of the container 100 and formed with an input portion 410, through which a material is input.

Although not shown, an opening/closing means for selectively opening and closing the juice discharge port 101 of the container 100 may be applied to the juice extraction module.

As the opening/closing means, a cock valve may be used. The cock valve includes a valve body moving forward or backward in the juice discharge port 101, wherein a leading end of the valve body is preferably oriented toward the juice discharge port 101.

In addition, the cock valve may include a juice discharge cock, which may be selectively connected to the juice discharge port 101 by the valve body.

As a means for opening and closing the juice discharge port 101, a variety of means may be employed in addition to the above structure.

A crushing portion 500 is formed on a top end of the screw 300 to have a shape narrowed upward.

The crushing portion 500 has further a crushing blade 510 formed thereon, wherein the crushing blade 510 extends in the shape of a spiral having a width gradually narrowed upward, more preferably toward a top apex of the crushing portion 500.

A central shaft 310 of the screw 300 may be formed on the top apex of the crushing portion 500.

The lid 400 has a crushing processing portion 600 formed in a bottom thereof to be concave upward from a face coupled with the container 100 in order to accommodate the crushing portion 500.

The crushing processing portion 600 has a shape gradually narrowed toward a top apex corresponding to the crushing portion 500.

In addition, the top apex of the crushing processing portion 600 is formed with a shaft hole, into which the central shaft 310 of the screw 300 is rotatably fitted.

While being connected with the input portion 410, the crushing processing portion 600 cooperates with the crushing portion 500 to serve to crush the material input through the input portion 410.

The crushing blade 510 is inserted and positioned in the crushing processing portion 600, and the crushing blade 510 cooperates with a specific shape of an inner surface of the crushing processing portion 600 to crush the material.

The input portion 410 is offset toward one side with respect to a central axis of the screw 300 and simultaneously should have such a large bottom width W (or inner diameter) that a large-sized material such as an apple is allowed to be input without being chopped.

The sieve 200 has the largest inner diameter at the top end thereof, and thus, a distance from the central axis of the screw 300 to the sieve 200 is set up to be largest at the top end of the sieve 200.

The bottom width of the input portion 410 is set up to be larger than the shortest distance from the central axis of the screw 300 to an inner circumferential surface of the top end of the sieve 200.

Accordingly, as viewed from the top, a region of the input portion 410 partially overlaps with a top end region of the sieve 200 and is out of the top end region of the sieve 200.

Embodiments of the present invention have a large difference in that a conventional juicer has a small-sized input portion so as to be generally positioned inside of a region of a sieve.

Also, the crushing processing portion 600 is formed to cover the entire bottom region of the input portion 410 at the height of the crushing processing portion 600 connected to the bottom end of the input portion 410.

Further, the input portion 410 is within a circle region having a diameter corresponding to the diameter of the crushing processing portion 600 with the central shaft 310 of the screw 300 as the center, and more preferably, is positioned to be offset within one side of semicircle regions into which the circle region is divided by a line passing through the central shaft 310.

In addition, the inner surface of the crushing processing portion 600, particularly an inner crushing processing surface 610 is formed to be gradually close to the crushing blade 510 of the crushing portion 500 in a direction in which the crushing blade 510 runs from the bottom end of the input portion 410.

Accordingly, when the material is expelled out by the crushing blade 510, the material is held by the inner surface of the crushing processing portion 600, so that a lateral side of the material is crushed by the crushing blade 510, and the material is dragged into the crushing processing portion according to the rotation of the crushing portion.

This provides an effect of automatically crushing the material even if a user inputs the material into the input portion 410 and then does not push the input material again.

The crushing portion 500 further has one or more auxiliary crushing blades formed thereon so that they assist the crushing blade 510 to crush the material more effectively.

In such a case, the crushing blade 510 first crushes the material, and the auxiliary crushing blades may crush the material more finely.

As mentioned above, since a portion of the input portion 410 extends out of the top end region of the sieve 200, a material guide surface 620 is provided on the inner surface of the crushing processing portion 600 so that the material input through the input portion 410 can be guided to the sieve 200.

That is, the material guide surface 620 is provided as an element for smoothly connecting the sieve 200 and the input portion 410 extending to the outside to such an extent as to use an uncut apple as it is.

Also, the material guide surface 620 continues from the input portion 410 while overlapping with the input portion 410 and is formed to be inclined toward the central axis of the crushing portion 500, thereby causing a lateral side of the material to begin to be milled by the crushing blade 510.

In order to improve crushing processability, one or more milling blades 630 may be further formed on the crushing processing surface 610.

In this embodiment, the plurality of milling blades 630 are spaced apart from each other and extend from an upper portion of the crushing processing surface 610 to a lower portion thereof, and each of the milling blades 630 is gradually close to the crushing blade 510 as it goes from the upper portion toward the lower portion.

The crushing portion 500 passes over the top end of the container 100 and sieve 200 and is accommodated and positioned in the crushing processing portion 600 positioned in the lid 400. The crushing portion 500 and the crushing processing portion 600 cooperate with each other to fully crush the material input through the input portion 410, thereby making it possible to smoothly extract juice from the material even if the user does not chop the material in advance.

Since the juice is extracted from the material fully crushed as above in the sieve 200, there is an effect of preventing the sieve 200 from being deformed.

In addition, a lateral side of the material is processed by the crushing blade 510, which can be performed only by forming the crushing portion 500 to have a length suitable for the height of the material. Thus, the protruding length of the screw blade need not extend in order to cut the material itself.

Further, a sieve insertion step 420 may be formed in a bottom of the crushing processing portion 600 to be snugly fitted to the top end of the sieve 200.

The bottom end of the material guide surface 620 meets the sieve insertion step 420 in a stepwise manner, wherein the bottom end of the material guide surface 620 is formed to conform to an inner surface of the top end of the sieve 200.

Accordingly, the material crushed through the crushing processing portion 600 is smoothly guided into the sieve 200 along the material guide surface 620.

Figure 7:
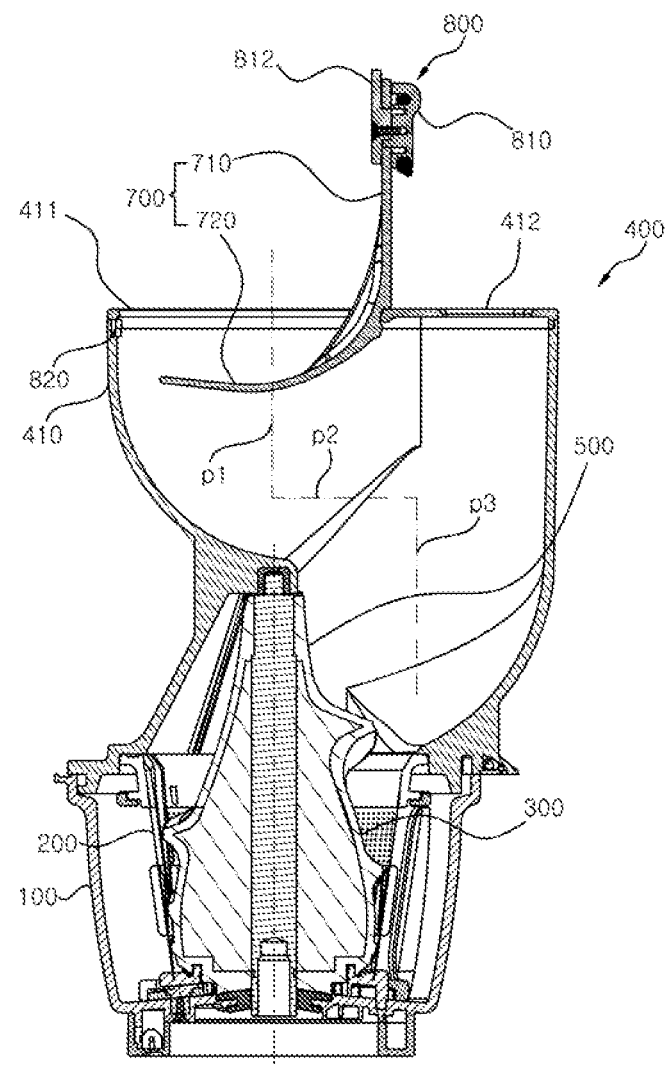
FIG. 7 is a sectional view showing a juice extraction module for a juicer according to another embodiment of the present invention when a safety cover is in a first position.
Figure 8:
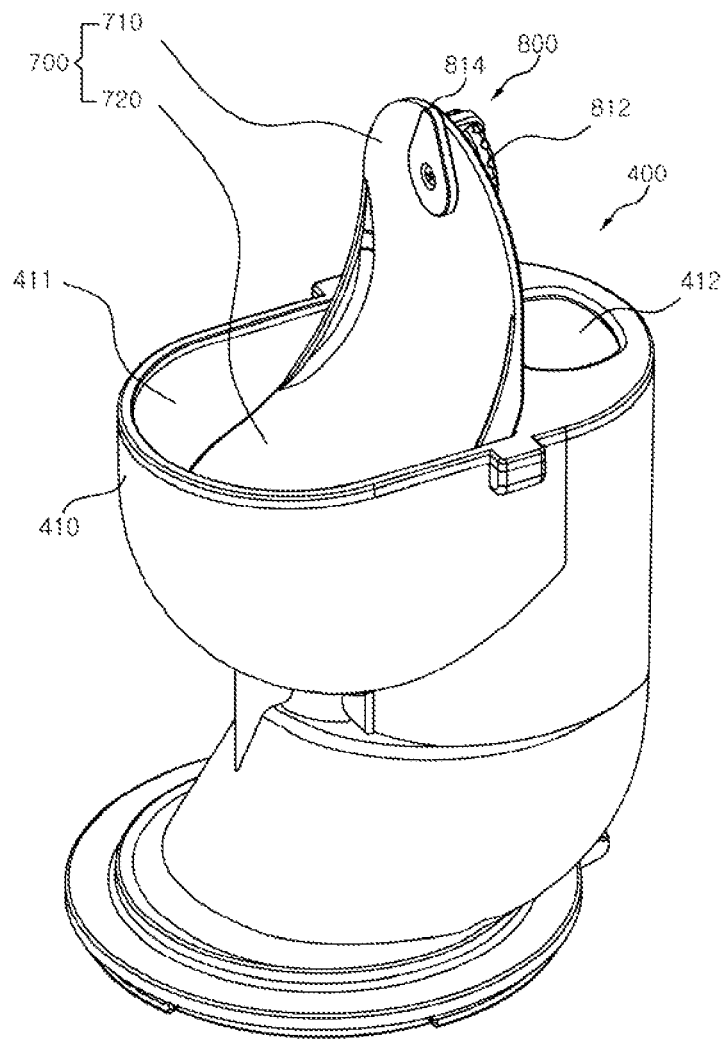
FIG. 8 is a perspective view showing a lid of the juice extraction module for a juicer shown in FIG. 7 when the safety cover is in the first position.
Figure 9:
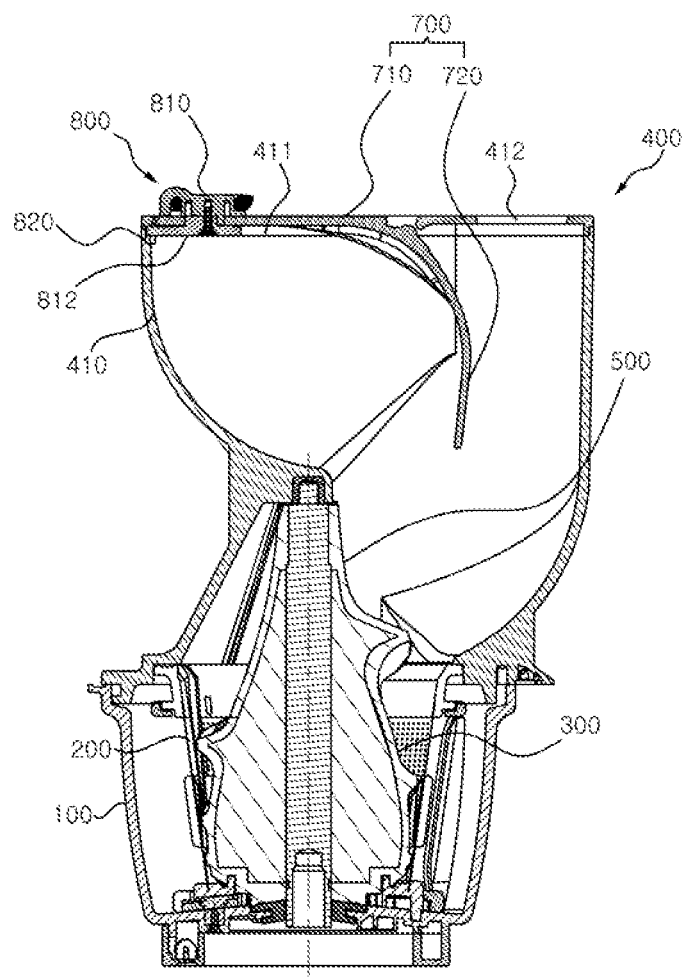
FIG. 9 is a sectional view showing the juice extraction module for a juicer shown in FIGS. 7 and 8 when the safety cover is in a second position.
Figure 10:
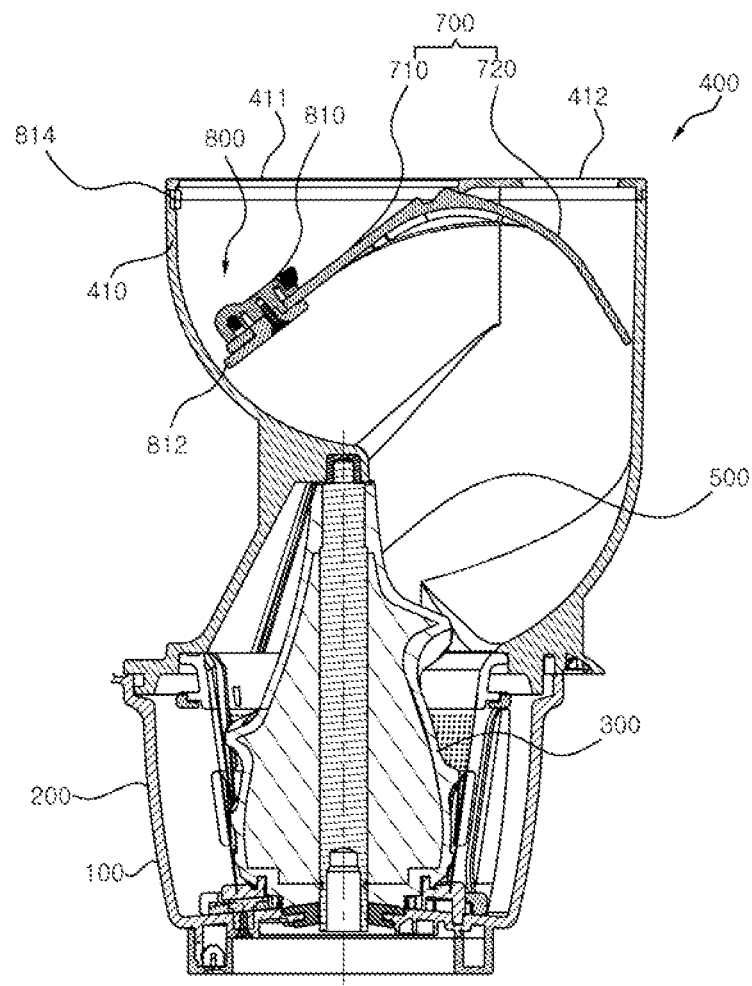
FIG. 10 is a sectional view showing the juice extraction module for a juicer shown in FIGS. 7 to 9 when the safety cover is in a third position.
Figure 11:
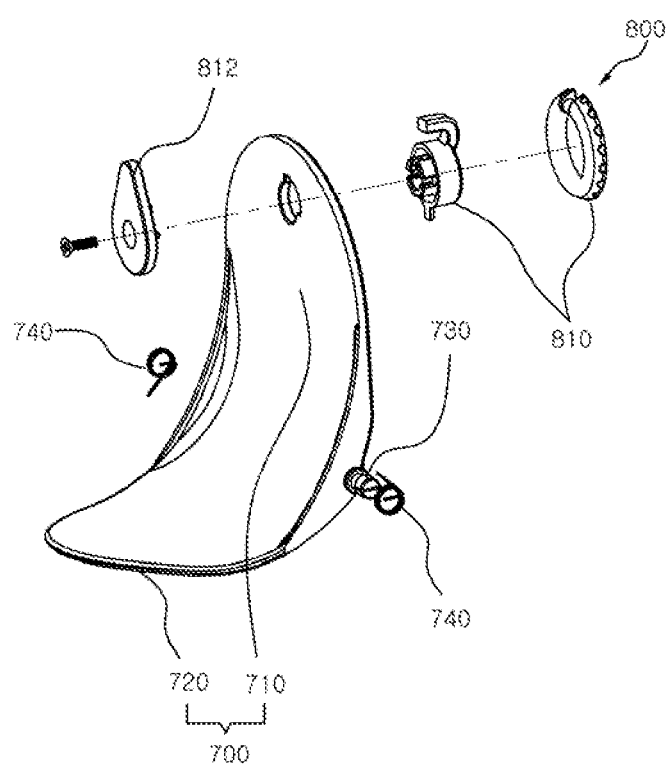
FIG. 11 is an exploded perspective view illustrating the safety cover of the juice extraction module for a juicer shown in FIGS. 7 to 10.

FIG. 7 is a sectional view showing a juice extraction module for a juicer according to another embodiment of the present invention when a safety cover is in a first position; FIG. 8 is a perspective view showing a lid of the juice extraction module for a juicer shown in FIG. 7 when the safety cover is in the first position; FIG. 9 is a sectional view showing the juice extraction module for a juicer shown in FIGS. 7 and 8 when the safety cover is in a second position; FIG. 10 is a sectional view showing the juice extraction module for a juicer shown in FIGS. 7 to 9 when the safety cover is in a third position; and FIG. 11 is an exploded perspective view illustrating the safety cover of the juice extraction module for a juicer shown in FIGS. 7 to 10.

Referring to FIGS. 7 to 10, a juice extraction module for a juicer according to this embodiment further includes a safety cover 700 and a modified structure of a top end of the input portion 410 related thereto as compared with the juice extraction module of the previous embodiment.

The safety cover 700 and the modified structure of the top end of the input portion 410, which will be described in detail below, are to solve a safety problem that may occur due to the enlarged area of the input portion 410 as described in the previous embodiment. The safety cover 700 and the modified structure are provided to prevent a person's hand from reaching the screw 500 through the input portion 410 in a process of inputting a material through the input portion 410 or regardless of the input of the material.

Like the previous embodiment, the lid 400 is provided with the input portion 410. A main input opening 411 and a secondary input opening 412 having a size smaller than the main input opening 411 are formed in the top end of the input portion 410.

The secondary input opening 412 may be formed to have a size compliant with current safety standards, and if necessary, may be eliminated.

The safety cover 700 operates when a relatively large material is input through the main input opening 411, thereby securing user's safety.

The safety cover 700 is formed to have an approximately "L"-shaped cross section and integrally includes a first cover portion 710 and a second cover portion 720 connected substantially perpendicularly to the first cover portion 710.

In addition, the safety cover 700 is rotatably installed to the main input opening 411 while being formed to have a size to be accommodated in the top end of the input portion 410, more specifically, in the main input opening 411

The safety cover 700 may be displaced between a first position of FIGS. 7 and 8, in which the first cover portion 710 almost fully opens the main input opening 411 by the rotation of the safety cover 700, a second position of FIG. 9, in which the first cover portion 710 of the safety cover 700 covers the main input opening 411, and a third position of FIG. 10, in which the first cover portion 710 and the second cover portion 720 at least partially cover the main input opening 411 and the secondary input opening 412, respectively.

Referring to FIG. 11, the safety cover 700 is provided with a pair of rotational shafts 730 at both sides of a position in which the first cover portion 710 and the second cover portion 720 are connected to each other.

The pair of rotational shafts 730 are rotatably inserted into a pair of shaft grooves, which are formed in an upper inner surface of the input portion 410 (see FIGS. 7 to 10) to face each other.

That is, the rotational shafts 730 and the shaft grooves constitute a hinge for rotatably supporting the safety cover 700.

Alternatively, if the pair of rotational shafts are formed at the upper inner surface of the input portion 410 to face each other, the shaft grooves, into which the rotational shafts are rotatably inserted, are formed in both the sides of the safety cover 700, so that the hinge for rotatably supporting the safety cover 700 is defined.

Torsion springs 740 are respectively installed to the rotational shafts 730, which are portions of the hinge of the safety cover 700. The torsion springs 740 provide the safety cover 700 with a bias force so that the safety cover 700 is biased to the first position (see FIGS. 7 and 8), in which the first cover portion 710 is substantially vertically erected to almost fully open the main input opening 411 (see FIGS. 7 to 12).

When the material is input through the main input opening 411 of the input portion 410, the safety cover 700 may be rotated counterclockwise against the bias force of the torsion springs 740 by force of a person who inputs the material or by his or her hand, thereby being moved to the second position (see FIG. 9), or to the third position (FIG. 10) to which the safety cover 700 is further rotated counterclockwise after passing the second position.

It should be noted that as the means for biasing the safety cover 700 to the aforementioned first position, different kinds of elastic members or weights may also be employed instead of the torsion springs 740.

Using the bias means such as the torsion springs 740, the safety cover 700 can be maintained in the first position without additional external force, which helps the user input the material with ease.

In the first position shown in FIGS. 7 and 8, if a material such as an apple is put on the second cover portion 720 of the safety cover 700, the weight of the material, which pushes the second cover portion 720 down, overcomes the bias force of the bias means to smoothly rotate the safety cover 700 about the hinge.

The rotation causes the material to be smoothly guided to the position, in which the material is processed by the screw 500.

Meanwhile, in the first position shown in FIGS. 7 and 8, when a person puts his or her hand in the input portion 410, the hand pushes the second cover portion 720 of the safety cover 700.

The second cover portion 720 is pushed, whereby the safety cover 700 is smoothly rotated and then moved to the vicinity of the second position of FIG. 9, in which the first cover portion 710 blocks the main input opening 411 at the upper inner surface of the input portion 410.

Accordingly, since a gap between an edge of the top end of the input portion 410 and an edge of the first cover portion 710 is narrowed, finally, the hand or arm of the person can only be caught between the edge of the top end of the input portion 410 and the edge of the first cover portion 710, and thus, the person cannot put his or her hand deep in the input portion 410 any more.

Further, if the person's hand or arm is caught between the edge of the top end of the input portion 410 and the edge of the first cover portion 710, the rotation of the safety cover 700 stops and thus the hand or arm is maintained in the state that it is caught therebetween.

That is, the input portion 410 is blocked by the safety cover 700 so that the person's hand cannot move further.

As described above, in spite of having the input portion 410 large sized enough to input a large material such as an apple without chopping it, advantageously, the juice extraction module for a juicer according to this embodiment can essentially prevent the person's hand from reaching the screw 500 through the input portion 410.

Further, the juice extraction module for a juicer further includes a locking unit 800 for locking the safety cover 700 in the second position, in which the main input opening 411 is coved with the first cover portion 710 of the safety cover 700.

In this embodiment, the locking unit 800 includes a knob 810 positioned on an upper surface of the first cover portion 710 of the safety cover 700, and a locking piece 812 positioned on a lower surface of the first cover portion 710 and connected to the knob 810 by a connection portion penetrating the first cover portion 710.

In addition, the locking unit 800 includes a locking groove 820 formed in the inner surface of the input portion 410 so that the locking piece 812 is selectively inserted into the locking groove 820.

By rotating the knob 810, the locking piece 812 may be allowed to protrude outward from the edge of the first cover portion 710. The locking piece 812 is inserted into the locking groove 820 in such a protruding state of the locking piece 812, thereby locking the safety cover 700 in the second position shown in FIGS. 9 and 10.

In the second position, since the first cover portion 710 blocks the main input opening 411, it is possible to prevent contaminants from entering the input portion 410 through the main input opening 411.

Returning to FIG. 7, the input portion 410 is structured so that the center of the main input opening 411 in the upper part of the input portion 410 is offset from the center of the lower part thereof. That is, a material input path from the main input opening 411 to the lower part of the input portion 410 is defined in the form of an approximately "⌐" shape.

The "⌐" shaped material input path includes an upper path p1 vertically extending from the main input opening 411, a lower path p2 vertically extending downward from a position lower than the vertical upper path p1 to be offset from the upper path p1, and an approximately horizontal intermediate path p3 connecting the upper path p1 and the lower path p2.

In this embodiment, the upper path p1 is positioned vertically below the main input opening 411, and the lower path p3 is positioned vertically below the secondary input opening 412.

Such a "⌐" shaped material input path of the input portion 410 lengthens the entire length along which the material is input, thereby making it possible to prevent safety accident of infants or children. Also, a rotational radius of the safety cover 700 is secured in the secondary input opening 412 in which dust hardly collects, thereby effectively suppressing contamination of the safety cover 700.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A juice extraction module for a juicer, comprising:
   a container formed with a juice discharge port;
   a sieve positioned inside of the container;
   a screw positioned inside of the sieve to extract juice from a material;
   a lid coupled to a top end of the container and formed with an input portion through which the material is input; and
   a safety cover rotatably installed to a main input opening of a top end of the input portion to be movable between a first position and a second position,
   wherein the safety cover comprises
      a first cover portion erected to open the main input opening in the first position and closing the main input opening in the second position; and
      a second cover portion formed integrally with the first cover portion, the second cover portion moving the safety cover to the second position when the second cover portion is pushed by a downward applied force from the first position, whereby the first cover portion blocks the main input opening,
      wherein a portion of the safety cover where the first cover portion and the second cover portion meet provides a rotational center about which the first cover portion and the second cover portion rotate together as a unit at the main input opening, and
      wherein the safety cover is arranged such that, when the material is put on the second cover portion with the safety cover in the first position, the weight of the material pushes the second cover portion down, to rotate the safety cover toward the second position.

2. The juice extraction module according to claim 1, wherein the safety cover is connected by a hinge to both sides of the main input opening at both sides of a position in which the first cover portion and the second cover portion cross each other.

3. The juice extraction module according to claim 1, further comprising a hinge and a bias means installed to the hinge so that the safety cover is biased to the first position, wherein the hinge is connected to both sides of the main input opening at a position in which the first cover portion and the second cover portion are connected to each other.

4. The juice extraction module according to claim 3, wherein the bias means includes a torsion spring or weight.

5. The juice extraction module according to claim 1, further comprising a locking unit for locking the safety cover at the second position, wherein the locking unit comprises a knob positioned on an upper surface of the first cover portion and a locking piece positioned on a lower surface of the first cover portion and connected to the knob by a connection portion penetrating the first cover portion, the locking unit having a locking groove formed in the inner surface of the input portion so that the locking piece rotated by the knob is inserted into the locking groove.

6. The juice extraction module according to claim 1, wherein the input portion further comprises a secondary input opening formed in the top end thereof, the secondary input opening having a size smaller than the main input opening.

7. The juice extraction module according to claim 1, wherein the safety cover has a third position to which the safety cover is further rotated after passing the second position, and the first cover portion and the second cover portion at least partially cover the main input opening and a secondary input opening in the third position, respectively, wherein the secondary input opening has a size smaller than the main input opening and is formed in the top end of the input portion.

8. The juice extraction module according to any one of claims 1 to 7, further comprising:
   a crushing portion formed on a top end of the screw to be narrowed upward, the crushing portion having a crushing blade formed thereon; and
   a crushing processing portion connected to the input portion and formed in a bottom of the lid to be concave for accommodating the crushing portion,
   wherein the crushing blade crushes the material in advance within the crushing processing portion.

9. The juice extraction module according to claim 8, wherein the crushing blade is formed so that the material input through the input portion is crushed while a lateral side of the material is pushed outwards, and the crushing processing portion is provided with an inner surface to hold the material pushed outwards by the crushing blade, whereby the material is crushed between the crushing blade and the inner surface of the crushing processing portion.

10. The juice extraction module according to claim 8, wherein the crushing processing portion covers an entire bottom region of the input portion at the height of the crushing processing portion connected to a bottom end of the input portion.

11. The juice extraction module according to claim 10, wherein a bottom region of the input portion is positioned to be offset within a semicircle region of a circle having a diameter corresponding to a diameter of the crushing processing portion with a central shaft of the screw as a center.

12. The juice extraction module according to claim 10, wherein the inner surface of the crushing processing portion comprises a crushing processing surface formed to be gradually close to the crushing blade in a direction in which the crushing blade runs from the input portion.

13. The juice extraction module according to claim 10, wherein the inner surface of the crushing processing portion comprises a material guide surface continuing from the input portion and formed to be inclined toward a central axis of the crushing portion, whereby the material guide surface guides the material so that a lateral side of the material begins to be milled by the crushing blade.

14. The juice extraction module according to claim 13, wherein a bottom end of the material guide surface conforms to an inner surface of the sieve.

15. The juice extraction module according to claim 8, wherein the inner surface of the crushing processing portion comprises a crushing processing surface formed to be gradually close to the crushing blade in a direction in which the crushing blade runs from the input portion, and a material guide surface continuing from the input portion and formed to be inclined toward a central axis of the crushing portion to cause a lateral side of the material to begin to be milled by the crushing blade.

16. The juice extraction module according to claim 8, wherein the crushing portion extends to pass over a top end of the sieve and is accommodated in the crushing processing portion.

17. The juice extraction module according to claim 8, wherein the crushing processing portion comprises a crushing processing surface, and the crushing processing surface is formed with at least one milling blade.

18. The juice extraction module according to claim 1, wherein the input portion defines a "⌐" material input path, the material input path including an upper path vertically extending from the main input opening, a lower path vertically extending downward from a position lower than the upper path and being offset from the upper path, and an approximately horizontal intermediate path connecting the upper path and the lower path.

19. A safety cover rotatably installed to a main input opening of a mixer or juicer to move between a first position and a second position, the safety cover comprising:
   a first cover portion erected to open the main input opening in the first position and closing the main input opening in the second position; and
   a second cover portion moving the first cover portion to the second position, in which the first cover portion blocks the main input opening, when the second cover portion is pushed by a downward applied force from the first position,
   wherein a portion of the safety cover where the first cover portion and the second cover portion meet provides a rotational center about which the first cover portion and the second cover portion rotate together as a unit at the main input opening, and
   wherein the safety cover is arranged such that, when the material is put on the second cover portion with the safety cover in the first position, the weight of the material pushes the second cover portion down, to rotate the safety cover toward the second position.

* * * * *

UNITED STATES PATENT AND TRADEMARK OFFICE
CERTIFICATE OF CORRECTION

PATENT NO.        : 8,826,812 B2                                              Page 1 of 1
APPLICATION NO.   : 13/964822
DATED             : September 9, 2014
INVENTOR(S)       : Jong Boo Kim It is certified that error appears in the above-identified patent and that said Letters Patent is hereby corrected as shown below:

In the claims

Column 12, line 26:

"wherein the input portion defines a " ⌐ " material input path," should read,

--wherein the input portion defines a material input path,--.

Signed and Sealed this
First Day of March, 2016

Michelle K. Lee
*Director of the United States Patent and Trademark Office*